(12) United States Patent
Pippert

(10) Patent No.: US 6,675,699 B1
(45) Date of Patent: Jan. 13, 2004

(54) COMPOSITE COMPONENTS FOR USE IN PUMPS

(75) Inventor: Frederick B. Pippert, Sugar Land, TX (US)

(73) Assignee: Utex Industries, Inc., Houston, TX (US)

( * ) Notice: Subject to any disclaimer, the term of this patent is extended or adjusted under 35 U.S.C. 154(b) by 75 days.

(21) Appl. No.: 09/962,770

(22) Filed: Sep. 25, 2001

Related U.S. Application Data
(60) Provisional application No. 60/235,028, filed on Sep. 25, 2000.

(51) Int. Cl.⁷ .................................................. F16J 9/00
(52) U.S. Cl. ............................................................ 92/254
(58) Field of Search ........................................... 92/254

(56) References Cited

U.S. PATENT DOCUMENTS

| | | |
|---|---|---|
| 970,903 A | 9/1910 | Pennell |
| 1,788,950 A | 1/1931 | Heiner |
| 2,094,254 A | 9/1937 | Brubaker |
| 3,678,811 A | 7/1972 | Penwell |
| 3,769,880 A | 11/1973 | Mirjanic |
| 3,880,055 A | 4/1975 | Nakamura et al. |
| 4,300,439 A | 11/1981 | Degnan et al. |
| 4,315,454 A | 2/1982 | Knoedel |
| 4,389,921 A | 6/1983 | Bush |
| 4,406,558 A * | 9/1983 | Kochendorfer et al. ....... 92/187 |
| 4,453,454 A | 6/1984 | Comer |
| 4,466,399 A | 8/1984 | Hinz et al. |
| 4,516,479 A | 5/1985 | Vadasz |
| 4,603,062 A | 7/1986 | Ecer |
| 4,715,313 A | 12/1987 | Ecer |
| 4,746,554 A | 5/1988 | Ecer |
| 4,777,869 A * | 10/1988 | Dirkin et al. .................. 92/248 |
| 4,971,846 A | 11/1990 | Lundy |
| 5,061,159 A | 10/1991 | Pryor |
| 5,080,056 A | 1/1992 | Kramer et al. |
| 5,415,079 A | 5/1995 | Ching |
| 5,513,954 A | 5/1996 | Bourgeois |
| 5,617,773 A | 4/1997 | Craft et al. |
| 5,740,788 A | 4/1998 | Atmur et al. |
| 5,829,405 A | 11/1998 | Goedel |

* cited by examiner

*Primary Examiner*—F. Daniel Lopez
(74) *Attorney, Agent, or Firm*—C. James Bushman; Browning Bushman, P.C.

(57) ABSTRACT

Composite pump components, such as a connecting rod comprising an elongate body having a core portion made up of concentric laminations or layers, the layers having elements the majority of which extend longitudinally with respect to the connecting rod and that are supported in a polymeric matrix, the layers being bonded together.

11 Claims, 3 Drawing Sheets

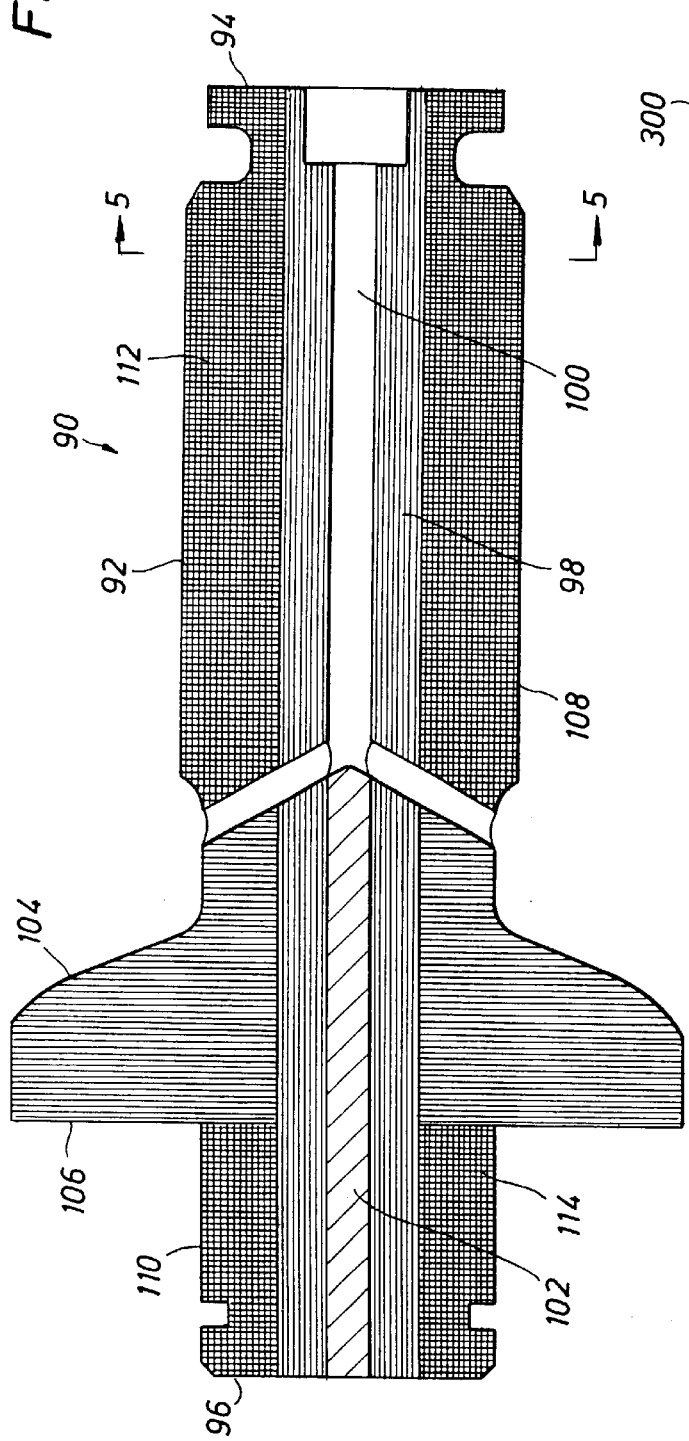
FIG. 4
FIG. 5
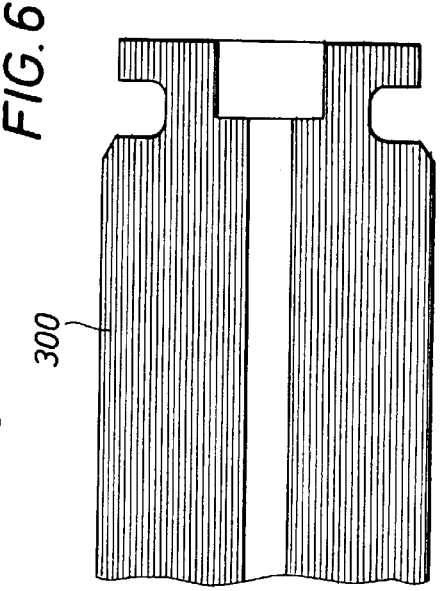
FIG. 6

COMPOSITE COMPONENTS FOR USE IN PUMPS

CROSS-REFERENCE TO RELATED APPLICATIONS

This application claims the benefit of U.S. Provisional Patent Application No. 60/235,028, filed Sep. 25, 2000.

BACKGROUND OF THE INVENTION

1. Field of the Invention

The present invention relates to reciprocating pumps, such as pumps of the duplex or triplex type, and more specifically, to the construction of components used in such pumps.

2. Description of the Prior Art

In certain applications corrosive or abrasive fluids, for example, oil well drilling fluid (commonly known as "mud"), must be pumped. Pumps used in these applications are reciprocating pumps typically of the duplex or triplex type provided with two or three cylinders, as the case may be, a piston being reciprocally disposed in each cylinder. Each cylinder communicates with a suction and discharge valve equipped chamber so that, as the piston is reciprocated by the piston rod, drilling fluid will be ultimately drawn into and discharged from the working chambers. Since the material pumped is of an abrasive character, and frequently corrosive as well, the inner components of the pumps are subjected to wear and require frequent replacement. One method to solve the corrosion problem is to construct the components of the pump with corrosion-resistant metals known to those skilled in the art. However, corrosion-resistant components made of metal are expensive and heavy, which increases the weight of the pump and makes change-out of worn parts in the field more difficult. Because of the pressures handled by pumps of the type under consideration, the forces acting on the pump components are generally quite severe. Accordingly, the pump components, in addition to being corrosion- and erosion-resistant, must be constructed of materials that will withstand these pressures and the accompanying forces.

A typical pump of the type under consideration comprises a pump housing that forms a pump cylinder in which is disposed a pump liner. Reciprocally disposed in the pump liner is a pump connecting rod generally fitted with a piston hub that, in certain cases, can be made monolithic with the connecting rod, the hub serving as a support for a seal that engages the pump liner.

SUMMARY OF THE INVENTION

It is therefore an object of the present invention to provide a new pump subassembly construction.

A further object of the present invention is to provide pump components made of composites.

Another object of the present invention is to provide a pump connecting rod that is made of composites.

Still a further object of the present invention is to provide a composite hub for use in a pump.

Yet a further object of the present invention is to provide a monolithic hub/connecting rod made of composites.

The above and other objects of the present invention will become apparent from the drawings, the description given herein, and the appended claims.

In one embodiment, the present invention provides a hub/connecting rod combination for use in a reciprocating pump. The hub/connecting rod combination has an elongate body portion with a first end and a second end. The body portion includes a core portion extending from the first end to the second end. The core portion is comprised of concentric layers, the layers comprising elements of a nonmetallic material, a majority of the elements being oriented longitudinally with respect to the core portion and extending from the first end to the second end. The elements are supported in a polymeric matrix, the layers of elements being bonded to one another. The hub/connecting rod combination further includes a composite hub portion extending laterally outwardly from the body portion, the hub portion being bonded to the body portion to form a monolithic structure.

In another embodiment of the present invention, there is provided a connecting rod for use in a reciprocating pump, the connecting rod having an elongate body with a first end and a second end and a core portion extending from the first end to the second end. The core portion is comprised of concentric layers, the layers comprising elements of a nonmetallic material. A majority of the elements are oriented longitudinally with respect to the core portion and extend from the first end to the second end. The elements are supported in a polymeric matrix and the layers are bonded to each other.

In still another embodiment of the present invention, there is provided a hub for attachment to a connecting rod used in a reciprocating pump comprising a tubular body having a first end and a second end, the tubular body including a core portion extending from the first end to the second end. The core portion is comprised of concentric layers, the layers being comprised of elements of a nonmetallic material, the majority of which are oriented longitudinally with respect to the core portion and extend from the first end to the second end, the elements being supported in a polymeric matrix. The layers are bonded to one another. The hub further includes a composite flange portion that extends radially outwardly from the tubular body and defines an annular piston seal support surface.

BRIEF DESCRIPTION OF THE DRAWINGS

FIG. 4 is a cross-sectional view of a monolithic piston hub/connecting rod combination in accordance with the present invention;

FIG. 5 is a view taken along the lines 5—5 of FIG. 4; and

FIG. 6 is a fragmentary, cross-sectional view showing another form of construction of the pump components of the present invention.

DESCRIPTION OF THE PREFERRED EMBODIMENTS

Figure 1:
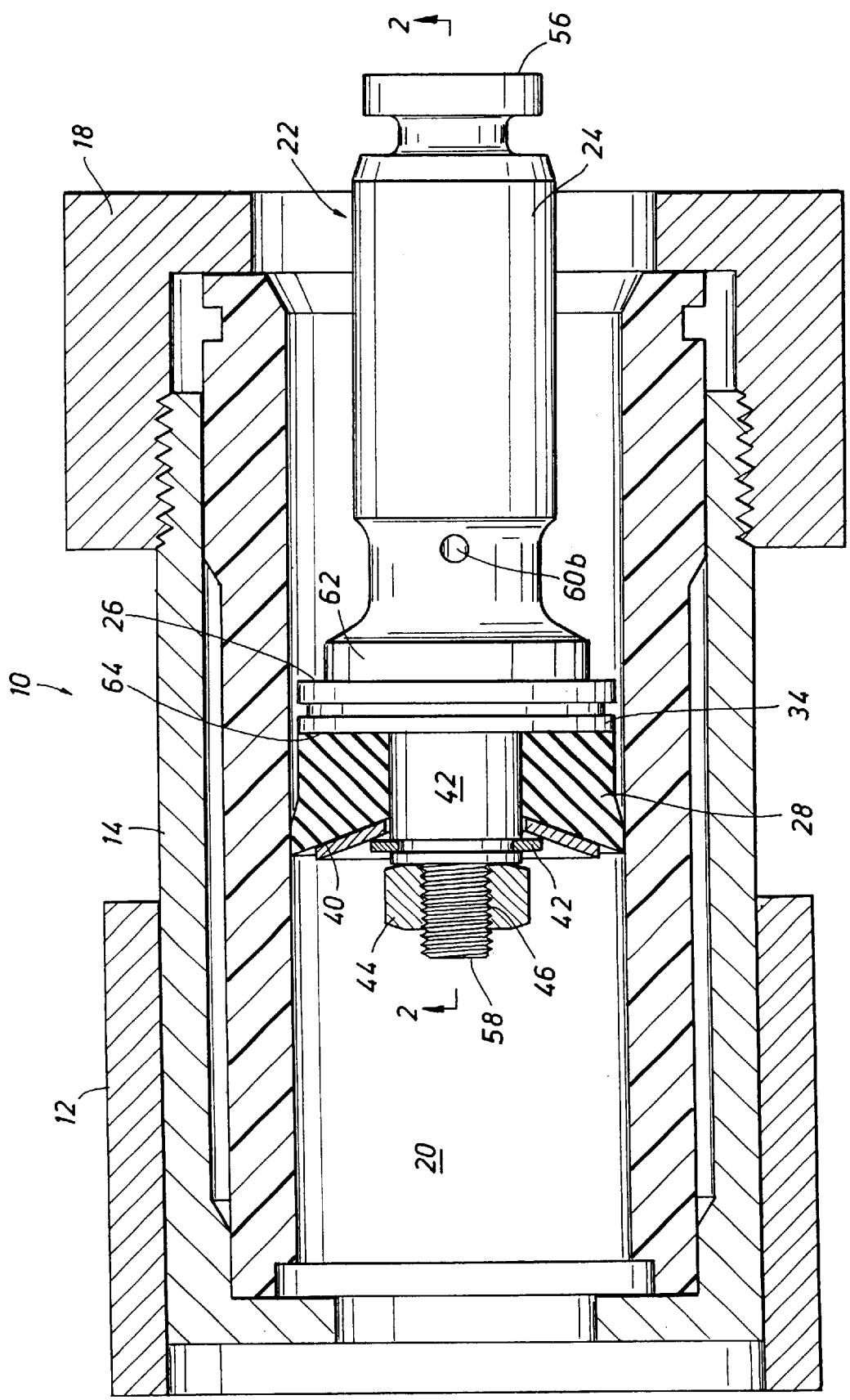
FIG. 1 is a simplified view, partially in section, of a fluid end assembly of a pump incorporating the pump components of the present invention.

With reference first to FIG. 1, there is shown a fluid end assembly of a pump, shown generally as 10. Pump 10 comprises a pump body 12 in which is received a pump casing 14. Received concentrically in pump casing 14 is a pump liner, shown generally as 16, pump liner 16 being of composite or metal construction. Pump liner 16 is held in pump casing 14 by means of a gland 18 threadedly received on pump casing 14. Reciprocally mounted in the cylindrical bore 20 formed by pump liner 16 is a pump head assembly, shown generally as 22, basically comprised of a connecting rod 24, a hub 26, and a pump seal 28, rod 24 and hub 26 being described more fully hereinafter. As will be understood, pump head assembly 22 is driven by a motor or the like, not shown. Additionally, and as is well understood to those skilled in the art, cylindrical bore 20 communicates with valve-equipped intake and exhaust chambers that are connected with supply lines, not shown.

In the embodiment shown in FIG. 1, hub 26 is a separate component mounted on connecting rod 24. Hub 26 has an annular, radially outwardly projecting flange 34 upon which is positioned a piston seal ring 28. A retainer ring 40 is held by a snap ring 42 against seal ring 28, snap ring 42 being received in a groove in the neck portion 43 of hub 26. A nut 44 is threadedly received on a threaded extension 46 of neck portion 43 of connecting rod 24 and secures seal ring 28 to hub 26 and connecting rod 24.

Figure 2:
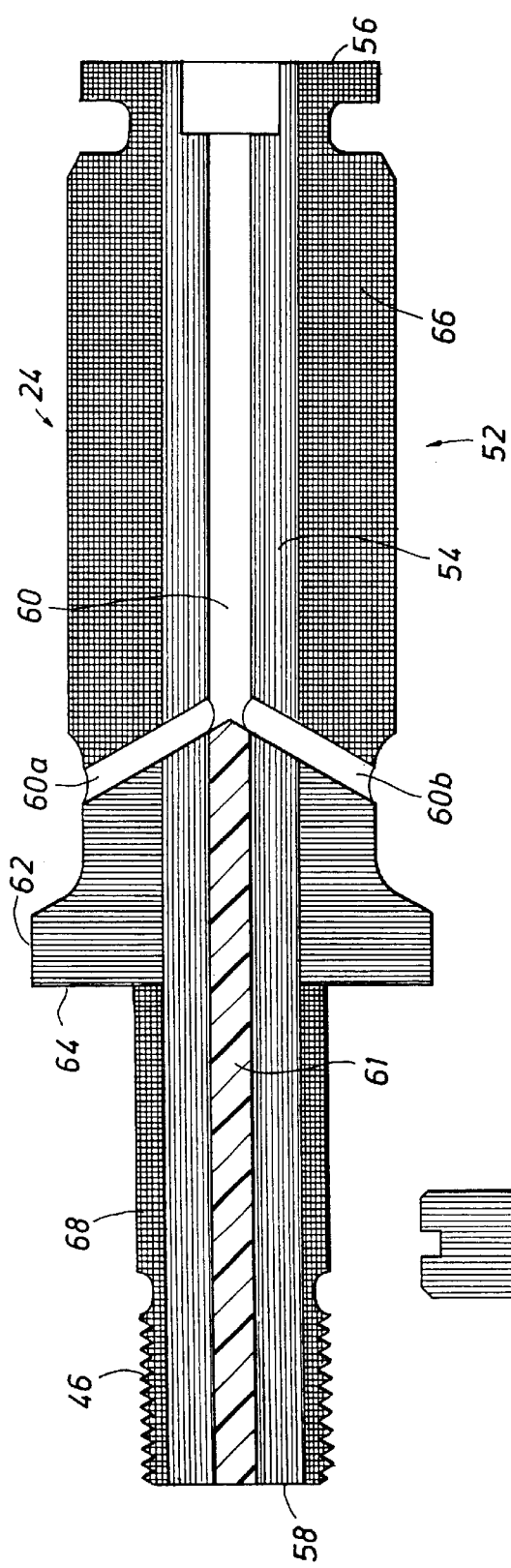
FIG. 2 is a cross-sectional view taken along the lines 2—2 of FIG. 1.

With reference now to FIG. 2, there is shown the composite connecting rod 24 in greater detail. The connecting rod 24 has a generally elongate body 52 having a first end 56 and a second end 58. Body 52 is comprised of a central core 54, which extends from first end 56 to second end 58 of body 52. Central core 54 is comprised of a plurality of concentric laminations or layers defining a central bore 60. A plastic plug 62 proximate second end 58 is received in a portion of bore 60 to prevent fluid being handled by the pump from passing through the connecting rod 24.

Connecting rod 24 further includes a hub support 62 formed of stacked laminations or layers, described more fully hereinafter. Basically, hub support 62 is in the form of a radially outwardly extending annular flange providing an annular hub support surface 64. It can be seen that hub support 62, which is monolithic with body 52, basically divides body 52 into a first body section that lies generally between first end 56 and hub support 62 and a second section that extends from support surface 64 to second end 58. The first section of body 52 includes a cylindrical outer sleeve 66 that is formed by a series of windings of a filament or fiber around core 54, the filaments being supported in a polymeric matrix, the sleeve 66 being bonded to core 54. In like manner, the second section of body 52 has a second sleeve 68, which is also formed of windings as described above with respect to sleeve 66, sleeve 68 being threaded as at 46 for receipt of retaining nut 44 to hold piston hub 26 and seal 28 on connecting rod 50. Bore 60, together with branches 60a and 60b, form a water course through which a cooling liquid can pass, as is well known to those skilled in the art. It will be appreciated that second end 56 of connecting rod 24 is connected in a suitable manner to a drive mechanism (not shown) that reciprocates connecting rod 24, as described above.

Figure 3:
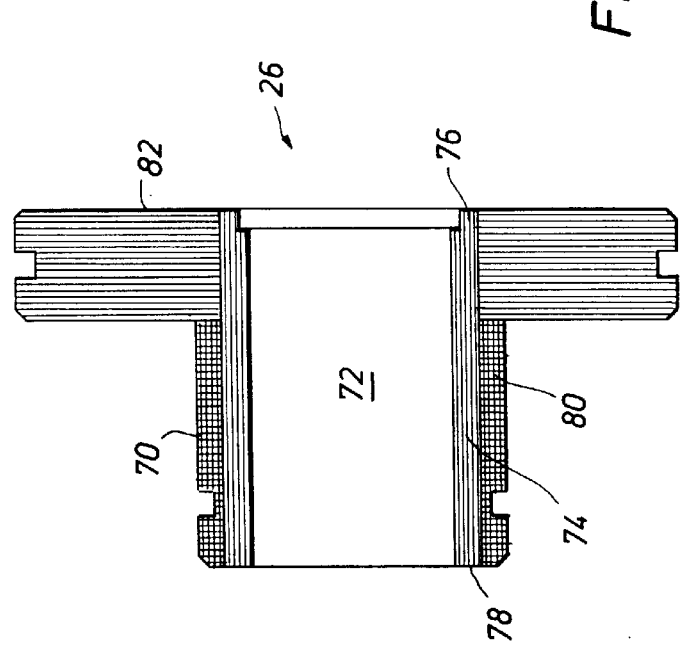
FIG. 3 is a cross-sectional view of a piston hub in accordance with the present invention.

With reference now to FIG. 3, hub 26 is shown in greater detail. Hub 26 has a tubular body 70 defining a passageway 72. In surrounding relationship to passageway 72 is a core portion 74, core portion 74 being constructed in the same manner as core portion 54 described above with respect to piston rod 24. Tubular body portion 70 has a first end 76 and a second end 78, the core portion 74 extending from first end 76 to second end 78. Tubular body 70 further includes a cylindrical sleeve section 80 that is composite in nature and that, as cylindrical sleeve 66, is formed of windings of a filament around core portion 74, the windings being supported in a polymeric matrix, cylindrical sleeve 80 being bonded to the core portion 74. Hub 26 further includes a laterally outwardly projecting annular flange 82, flange 82 being comprised of stacked layers or laminations of a nonmetallic fabric supported in a polymeric matrix, the layers being bonded to one another, flange portion 82 being bonded to tubular body 70.

With reference now to FIG. 4, there is shown a composite hub/connecting rod combination that is basically a monolithic structure. The hub/rod combination, shown generally as 90, comprises an elongate body portion 92 having a first end 94 and a second end 96. Body portion 92 is comprised of an inner core portion 98 that defines a bore 100, bore 100 being plugged proximate end 96 with a metal plug 102. Core portion 98 is constructed in the same manner as described above with respect to core portion 54, connecting rod 24, and core portion 74 of hub 26. Hub/rod combination 90 also includes a hub portion 104 that projects laterally outwardly from elongate body 92 and provides an annular seal support surface 106. Hub portion 104 has the same construction as flange 82 of hub 26 shown in FIG. 3 and hub support 62 of connecting rod 24, shown in FIG. 2. As can be seen, hub portion 104 generally divides the hub/rod combination 90 into a first section 108 extending from first end 94 to hub portion 104 and a second section 110 extending from second end 96 to seal support surface 106 formed on hub portion 104. Body portion 92 further includes a cylindrical sleeve 112 in surrounding relationship and bonded to core portion 98, cylindrical sleeve 112 having the same construction as described above with respect to cylindrical sleeve 66 of connecting rod 24, shown in FIG. 2. Likewise, the second cylindrical section 110 of hub/rod combination 90 has a cylindrical sleeve 114 in surrounding relationship and bonded to core portion 98, cylindrical sleeve 114 having the same construction as described above with respect to cylindrical sleeve 112.

With respect to FIG. 5, the constructions of the various portions of the components described above can be clearly seen. First, with respect to the various core portions, it can be seen in FIG. 5 that there is a plurality of elements, a cross-sectional view of which is indicated as 200. The elements are essentially formed into concentric layers, such as shown as 54 in FIG. 2, 74 in FIG. 3, and 98 in FIG. 4. Basically, such a construction can be accomplished using monofilament or multifilament fiber bundles, unidirectional ribbons, single-layer fabrics, or multi-layer fabrics, the prime requisite being that a majority of the elements, e.g., filaments or fibers, that make up the layers, e.g., layer 98, are longitudinally aligned with respect to the core or the long axis of the elongate or tubular bodies. In this regard, it will be appreciated that while the elements of the layers forming the cores of the various pump components described above will, for the most part, lie in a longitudinal direction with respect to the long axis of the component, it is to be understood that the layers may include elements, albeit in a minority amount, that are perpendicular to the longitudinally extending elements. It will be appreciated that, in operation, the pump subassembly, whether it be the monolithic hub/rod combination of FIG. 4 or the two-piece combination of the rod 24 and hub 26 shown in FIGS. 2 and 3, is subjected to alternating compressive and tension loading along its axial extent. Accordingly, it is believed that by forming the core of the piston rod, whether it be monolithic with the hub or not, with a majority of the elements aligned longitudinally as described above, there is provided a structure exhibiting greater resistance to these forces.

As can also be seen with respect to FIG. 5, when view in transverse cross-section, the windings 202 that make up the sleeves 112, 66, and 80, appear somewhat in the form of concentric layers. Indeed, it is within the scope of the present invention that the sleeves 112, 66, and 80 can be made of a fabric, e.g., a woven material, that is wound around the core portion of the pump components.

While the invention has been described with respect to a core comprised of concentric laminates or layers having elements the majority of which are longitudinally aligned with respect to the rod, and with outer cylindrical sleeves comprised of windings around the core, it is to be understood that, if desired, the entire tubular or elongate portions of the various body parts of the pump components could be made in the same manner as the core portions. Such a construction is shown in FIG. 6, which gives a fragmentary view of a first body section, lying, for example, between the first end 94 and the hub 104 of the hub/rod combination shown in FIG. 4 or the first body section lying between end 56 and hub support 62 of the connecting rod 24 shown in FIG. 2. Thus, as seen, the tubular or elongate body portion 300 would be made completely of the same construction as the core portions 98 and 54.

The pump components of the present invention are made of a composite comprised of a reinforcing filler supported in a polymeric matrix that can be a thermoplastic resin, a thermosetting resin, or mixtures thereof. As used herein, the term "composite" means a reinforcement, referred to herein as a "filler," e.g., fibers, filaments, fabrics, mats, particles, or flocs, encapsulated and/or supported by a suitable matrix or binder material, such as a thermosetting and/or thermoplastic polymeric material. Generally speaking, composites of the type used in the pump components of the present invention have a discontinuous phase formed by the filler, e.g., fiber particles, filaments, fabrics, mats, floc, or the like, that is stiffer and stronger than the continuous matrix phase, e.g., the thermosetting or thermoplastic resin. Generally speaking, the filler will be present in the composite in an amount of 7% or greater. The fillers or reinforcements that make up the composite can be fibers, laminar, fabrics, mats, or particulate in nature. The fiber reinforcements can in turn be divided into those containing discontinuous or continuous fibers or filaments. Fiber-reinforced composites contain fillers having lengths much greater than their cross-sectional dimensions. As noted, the fibrous filler can be of the discontinuous or continuous type, a discontinuous fiber being one in which its properties vary with its length. On the other hand, a continuous fiber or filament can be considered one in which, in general, any further increase in its length does not further increase certain physical properties, e.g., the elastic modulus. Continuous reinforcing fibers or fillers are available in many product forms ranging from monofilament to multifilament fiber bundles, and from unidirectional ribbons to single-layer fabrics and multilayer fabric mats. Particulates generally not useful as reinforcements in and by themselves can be used with fiber fillers as reinforcements and in certain cases can be used as reinforcements, depending upon the type of stresses imposed upon the particular pump components. Composites that are useful in the present invention are discussed in *Engineered Materials Handbook*, Vol. 1: Composites, ASM International, 1987, incorporated herein by reference for all purposes. Non-limiting examples of fibrous fillers, be they discontinuous or continuous, include glass fibers, carbon fibers, aramid fibers, polybenzimidazole fibers, boron fibers, silicon carbide fibers, aluminum oxide fibers, graphite fibers, metallic fibers, etc. Particulates and flocs can be made of the same materials of which the fibrous fillers are formed.

In addition to fillers or reinforcements, the composites used in the pump components of the present invention include, as a matrix or binder, a thermosetting resin, a thermoplastic resin, or mixtures thereof. Non-limiting examples of thermosetting resins include epoxy resins, bismalamide resins, polyamide resins, phenolic resins, polyurethanes, etc., and mixtures thereof. Non-limiting examples of thermoplastic resins that can be used in the composites of the present invention include polyether ether ketones, polyphenylene sulfides, polyetheramides, polyamide amides, polypropylenes, polyurethanes, etc., and mixtures thereof. It will also be appreciated that in certain cases it may be possible to use mixtures of thermoplastic and thermosetting resins, just as it is possible to use more than one type and/or form of filler or reinforcement in the composites used to make the pump components of the present invention.

It will be appreciated that in cases where the pump components of the present invention form a monolithic structure, various sections of that monolithic structure can be formed separately and then bonded together. More particularly, various sections of the pump components can be formed from composites in a manner that best addresses the stresses to which that particular section of the pump component is subjected. Thus, portions of the various components can be made up of concentrically layered or laminated portions together with stacked laminated or layered portions and portions wherein the composite is formed by cylindrical windings, all, of course, being bonded together in polymeric matrices. In general, it can be seen that regardless of the pump component, the prime requisite is that components have an inner core that is made up of concentric layers, the layers being comprised of elements the majority of which are aligned longitudinally with respect to the core, the elements being supported in a polymeric matrix or binder, the layers being bonded together to form a unitary structure.

It will be apparent that by selecting the composition of the composite and the manner of construction of various sections, one can tailor a pump component such that its various sections resist the forces applied to that particular section. For example, it will be appreciated that by using successive layers of windings, as described above, to form the cylindrical sleeves, the sleeve will exhibit a very high hoop force to resist forces against and radially outwardly of the sleeves.

The pump components of the present invention can be formed in various ways, depending upon the desired construction composite. For example, in forming a cylindrical sleeve of a continuous filament, e.g., glass or the like, the filament can be coated or impregnated with a thermosetting resin, such as epoxy resin, the coated filament being wrapped around the cylindrical section until the appropriate outer dimension—i.e., radial thickness—is achieved. This preform can then be placed in an oven at an appropriate temperature for a specified time to achieve a full cure. It will also be appreciated that once the pump component blanks are made, they can be machined to form various passageways, grooves, etc.

Although the invention has been described with the core portion forming a central bore, it is to be understood that the central bore could be filled. In forming the core portion, a mandrel or the like is used, the layers or laminations forming the core portion being wound around the mandrel. Accordingly, if the mandrel were not removed, the central bore would be filled—i.e., the component would be essentially a solid structure. Accordingly, it is to be understood that the use of the term "central bore" is intended to encompass constructions wherein a mandrel or the like used to form the pump component is not removed or that a plug is inserted in at least a portion of the bore, meaning that the pump component has no central bore in the sense that it is a void.

The term "support" or "supported" as used herein and with reference to the relationship between the filler/reinforcement and the polymeric matrix is intended to encompass impregnation or coating of the filler prior to forming the pump component or portion thereof, winding a matrix-free, continuous filament to a sleeve of the desired radial thickness, and then adding a polymeric matrix in a mold; filling a mold with discontinuous fibers and then adding a suitable polymeric matrix; impregnating a series of fabric mats with a binder and pressing the mats together to form the stacked layers; etc. In general, the word "support" is intended to encompass any structural relationship between the filler/reinforcement and the polymeric matrix wherein the filler/reinforcement is essentially immobilized once the component has been cured.

The foregoing description and examples illustrate selected embodiments of the present invention. In light thereof, variations and modifications will be suggested to one skilled in the art, all of which are in the spirit and purview of this invention.

What is claimed is:

1. A hub/connecting rod combination for use in a reciprocating pump, comprising:

an elongate body portion having a first end and a second end, said body portion including a core portion extending from said first end to said second end, said core portion being comprised of concentric layers, said layers comprising elements of a nonmetallic material, a majority of said elements being oriented longitudinally with respect to said core portion and extending from said first end to said second end, said elements being supported in a polymeric matrix, said layers being bonded to each other; and a composite hub portion extending laterally outwardly from said body portion, said hub portion being bonded to said core portion to form a monolithic structure, said hub portion comprising stacked layers of a nonmetallic fabric supported in a polymeric matrix, said layers being bonded to each other.

2. The hub/connecting rod combination of claim 1 wherein said elongate body portion has a first body section between said first end and said hub portion and a second body section between said second end and said hub portion.

3. The hub/connecting rod combination of claim 2 wherein said first body section comprises a first cylindrical sleeve in surrounding relationship and bonded to said core portion, said first cylindrical sleeve being comprised of concentric layers, said layers comprising elements of a nonmetallic material, a majority of said elements being oriented longitudinally with respect to said core portion and extending from said first end to said hub portion, said elements being supported in a polymeric matrix, said layers being bonded to one another.

4. The hub/connecting rod combination of claim 2 wherein said first body section comprises a first composite cylindrical sleeve in surrounding relationship and bonded to said core portion.

5. The hub/connecting rod combination of claim 4 wherein said first cylindrical sleeve is comprised of windings of a filament around said core portion, said windings being supported in a polymeric matrix.

6. The hub/connecting rod combination of claim 2 wherein said second body section comprises a second composite cylindrical sleeve in surrounding relationship and bonded to said core portion.

7. The hub/connecting rod combination of claim 6 wherein said second cylindrical sleeve is comprised of windings of a filament around said core portion, said windings being supported in a polymeric matrix.

8. A hub for attachment to a connecting rod used in a reciprocating pump comprising:

a tubular body having a first end and a second end, said tubular body including a core portion, said core portion extending from said first end to said second end and being comprised of concentric layers, said layers comprising elements of a nonmetallic material, a majority of said elements being oriented longitudinally with respect to said core portion and extending from said first end to said second end, said elements being supported in a polymeric matrix, said layers being bonded to each other; and a composite flange portion, said flange portion extending radially outwardly from said tubular body, said flange portion defining an annular piston seal support surface and being bonded to said tubular body portion, said flange portion comprising stacked layers of a nonmetallic fabric supported in a polymeric matrix, said layers being bonded to each other.

9. The hub of claim 8 wherein said tubular body portion includes a composite cylindrical sleeve in surrounding relationship and bonded to said core portion.

10. The hub of claim 9 wherein said cylindrical sleeve is comprised of concentric layers, said layers comprising elements of a nonmetallic material, a majority of said elements being oriented longitudinally with respect to said core portion and extending from said second end to said flange portion, said elements being supported in a polymeric matrix, said layers being bonded to each other.

11. The hub of claim 8 wherein said cylindrical sleeve comprises windings of a filament around said core portion, said windings being supported in a polymeric matrix.

* * * * *